(12) United States Patent
Heissler et al.

(10) Patent No.: US 10,409,788 B2
(45) Date of Patent: Sep. 10, 2019

(54) MULTI-PASS DUPLICATE IDENTIFICATION USING SORTED NEIGHBORHOODS AND AGGREGATION TECHNIQUES

(71) Applicant: SAP SE, Walldorf (DE)

(72) Inventors: Larissa Heissler, Mühlhausen (DE); Andre Adam, Walldorf (DE); Philipp Mail, Waghäusel (DE); Florian Hoffmann, Oftersheim (DE)

(73) Assignee: SAP SE, Walldorf (DE)

( * ) Notice: Subject to any disclaimer, the term of this patent is extended or adjusted under 35 U.S.C. 154(b) by 236 days.

(21) Appl. No.: 15/413,144

(22) Filed: Jan. 23, 2017

(65) Prior Publication Data

US 2018/0210903 A1 Jul. 26, 2018

(51) Int. Cl.
*G06F 16/215* (2019.01)

(52) U.S. Cl.
CPC .................................. *G06F 16/215* (2019.01)

(58) Field of Classification Search
CPC ...................................................... G06F 17/156
See application file for complete search history.

(56) References Cited

U.S. PATENT DOCUMENTS

| | | | |
|---|---|---|---|
| 7,742,970 B2 | 6/2010 | Thierer et al. | |
| 8,392,384 B1 * | 3/2013 | Wu ................... | G06F 17/30156 707/693 |
| 8,630,888 B2 | 1/2014 | Seefeld et al. | |
| 8,943,059 B2 | 1/2015 | Rozenwald et al. | |
| 10,096,381 B1 * | 10/2018 | McNair .................. | G16H 50/70 |
| 2004/0249779 A1 * | 12/2004 | Nauck ................ | G05B 13/0275 706/47 |
| 2008/0133522 A1 | 6/2008 | Bordner et al. | |
| 2010/0088296 A1 * | 4/2010 | Periyagaram ........... | G06F 3/061 707/705 |
| 2011/0010181 A1 * | 1/2011 | Iyer ..................... | G06Q 10/0831 705/1.1 |
| 2013/0311498 A1 * | 11/2013 | Lambert ........... | G06F 17/30943 707/758 |

(Continued)

OTHER PUBLICATIONS

Vatsalan, Dinusha, and Christen, Peter, "Sorted nearest neighborhood clustering for efficient private blocking," In Pacific-Asia Conference on Knowledge Discovery and Data Mining, pp. 341-352, Springer Berlin Heidelberg, 2013.

(Continued)

*Primary Examiner* — Grace Park
*Assistant Examiner* — J Mitchell Curran
(74) *Attorney, Agent, or Firm* — Jones Day

(57) ABSTRACT

Systems and methods are provided herein for multi-pass duplicate identification using sorted neighborhoods. Data comprising a plurality of data records is received. Neighborhood records are generated by merging the plurality of data records with reference records stored in a remote data store. A resource identification field is assigned to each reference record. A pair distance, for each pair of neighborhood records having different resource identification fields, is determined by calculating a standard deviation of distances between each attribute of the pair scaled by a filled pairs quote value. Possible duplicate records are identified by evaluating each pair distance against a threshold, each possible duplicate having grouped attributes. Final duplicate records are identified by matching each group to a key.

20 Claims, 8 Drawing Sheets

(56) References Cited

U.S. PATENT DOCUMENTS

2015/0332291 A1* 11/2015 Gillooly ................ G06Q 20/20
705/7.29

OTHER PUBLICATIONS

Yan, Su, Dongwon Lee, Min-Yen Kan, and Lee C. Giles, "Adaptive sorted neighborhood methods for efficient record linkage," In Proceedings of the 7th ACM/IEEE-CS joint conference on Digital libraries, pp. 185-194, ACM, 2007.

* cited by examiner

| | Forename | Middle Name | Last Name |
|---|---|---|---|
| | J2l3 | | M7l8r |
| | J2l3 | | M7ll8r |

MULTI-PASS DUPLICATE IDENTIFICATION USING SORTED NEIGHBORHOODS AND AGGREGATION TECHNIQUES

TECHNICAL FIELD

The subject matter described herein relates to multi-pass duplicate identification of records within a database management system using sorted neighborhoods and aggregation techniques.

BACKGROUND

Databases are continuing to grow in size. Screening for duplicates within large databases through window screening can be time consuming. Additionally, user manipulation of duplicate search parameters to meet specific result outcomes can be tedious.

SUMMARY

In one aspect, a plurality of data records are received. A plurality of neighborhood records are generated by merging the plurality of data records with a plurality of reference records stored in a remote data store. A resource identification field is assigned to each reference record. In some variations, the resource identification field can identify a source location of each reference record. In other variations, the plurality of data records and the plurality of neighborhood records can be related to business partner screening.

A pair distance, for each pair of neighborhood records having different resource identification fields, is determined by calculating a standard deviation of distances between each attribute of the pair scaled by a filled pairs quote value. In some variations, the filled pairs quote value can be one more than the ratio of a number of unfilled attributes of the pair of neighboring records to a number of filled attributes for each pair.

A plurality of possible duplicate records are identified by evaluating each pair distance against a threshold, each possible duplicate having grouped attributes. In some variations, the threshold can be a product of a fuzzy factor and a maximum string length of an attribute. The fuzzy factor can be pre-determined by a user.

A plurality of final duplicate records are identified by matching each group to a key. In some variations, the key can either a definite key or a field percentage key. The definite key can be defined by a user. The field percentage key can be based on a percentage of attributes within the group matches predetermined attributes.

In some variations, an expectation value can be received from a user selection of the displayed plurality of final duplicate records. A refined plurality of final duplicate records can be identified by matching the expectation value to the plurality of final duplicate records.

In other variations, each neighborhood record can include a plurality of attributes categorized based on a plurality of standardized attributes and are sorted based on a sorting key associated with each attribute.

In some variations, systems can be provided for implementing various operations described herein that include at least one data processor and memory. Such systems can include an in-memory database. In other variations, computer-programmable products can be provided for implementing various operations described herein.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an ability to identify duplicates in large databases while, at the same time, reducing computer resource consumption and providing more efficient duplicate identification. Moreover, the multi-pass sorted neighborhood duplicate identification allows for user input to modify parameters to for targeted searching. This allows users to proactively manage duplicate identification within the sorted neighborhood. Still further, the current subject matter uses a standard deviation approach to determine distances between records within a neighborhood to provide more accurate duplicate identification results.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Through merging and sorting of desired search records with a reference list, duplicate identification can be simplified to the comparison of neighboring records. Potential duplicates can be identified based on neighboring record pairs. Pair distances can be calculated for each pair and evaluated against a threshold and a key to identify duplicates. Through user interaction, identified duplicates can be confirmed and re-evaluated.

Figure 1:
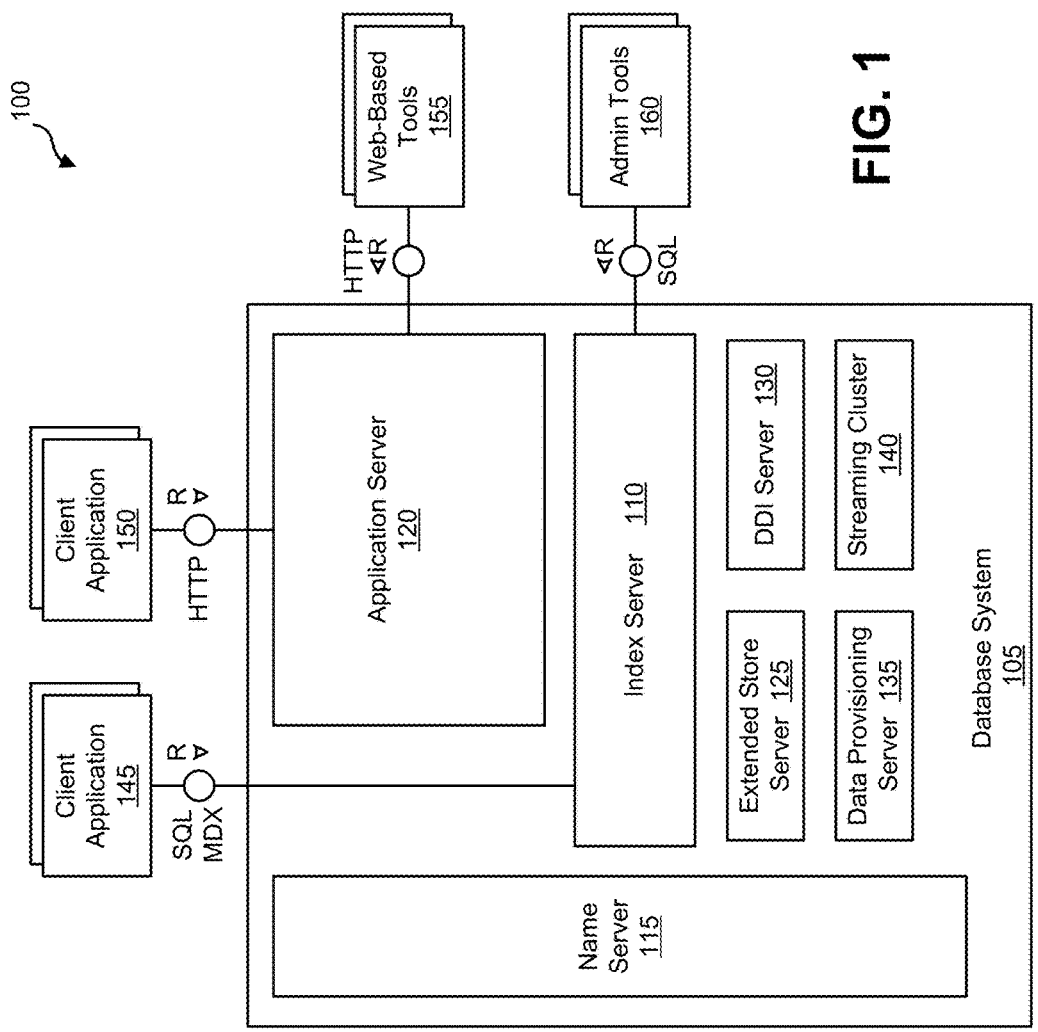
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
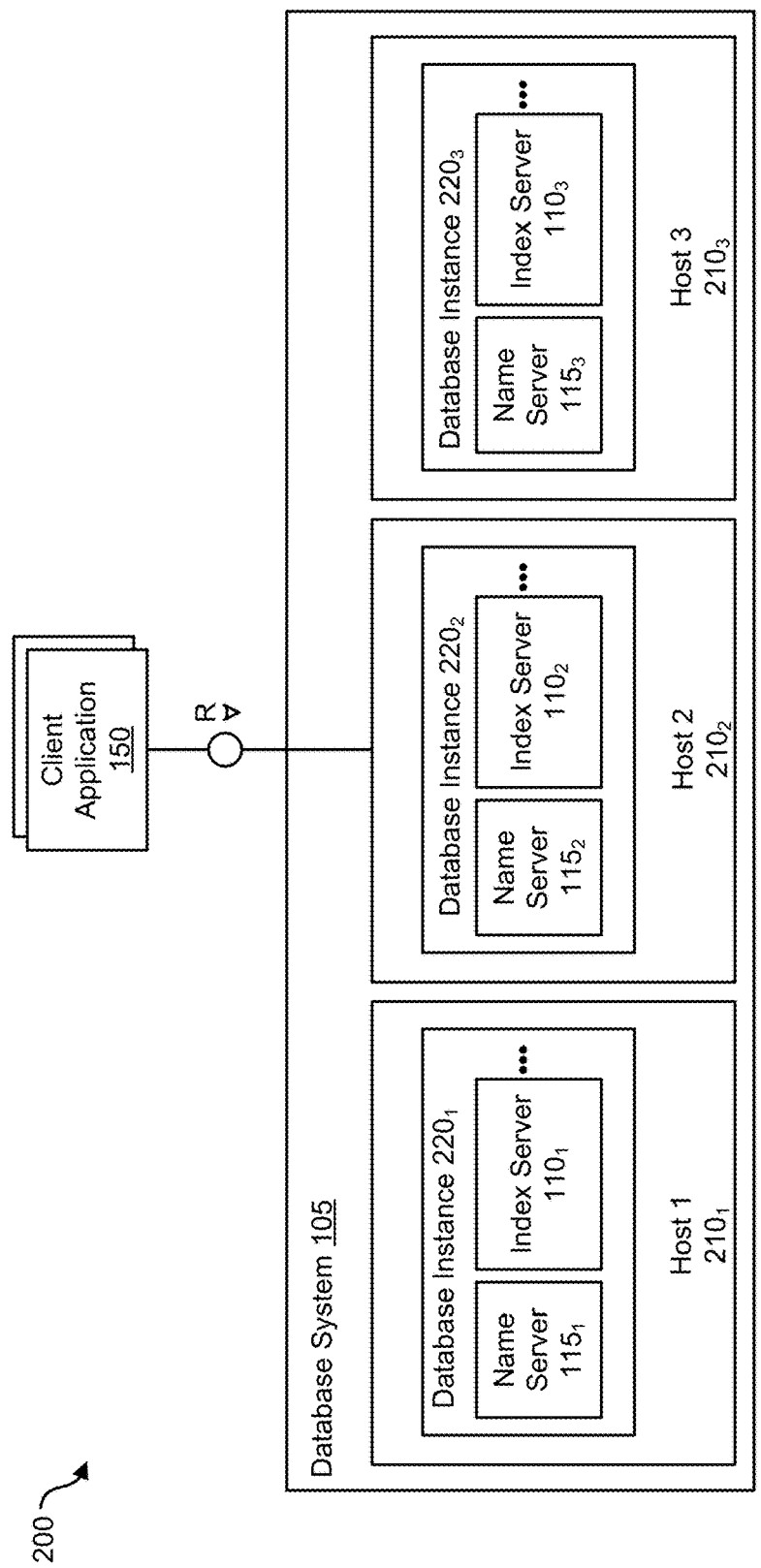
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1\text{-}3}$, $120_{1\text{-}3}$, in the system, if required.

As is illustrated in FIG. 2, the distributed database system 105 can be installed on more than one host $210_{1\text{-}3}$. Each host $210_{1\text{-}3}$ is a machine that can comprise at least one data processor (e.g., a CPU, etc.), memory, storage, a network interface, and an operation system and which executes part of the database system 105. Each host $210_{1\text{-}3}$ can execute a database instance $220_{1\text{-}3}$ which comprises the set of components of the distributed database system 105 that are installed on one host $210_{1\text{-}3}$. FIG. 2 shows a distributed system with three hosts, which each run a name server $110_{1\text{-}3}$, index server $120_{1\text{-}3}$, and so on (other components are omitted to simplify the illustration).

Figure 3:
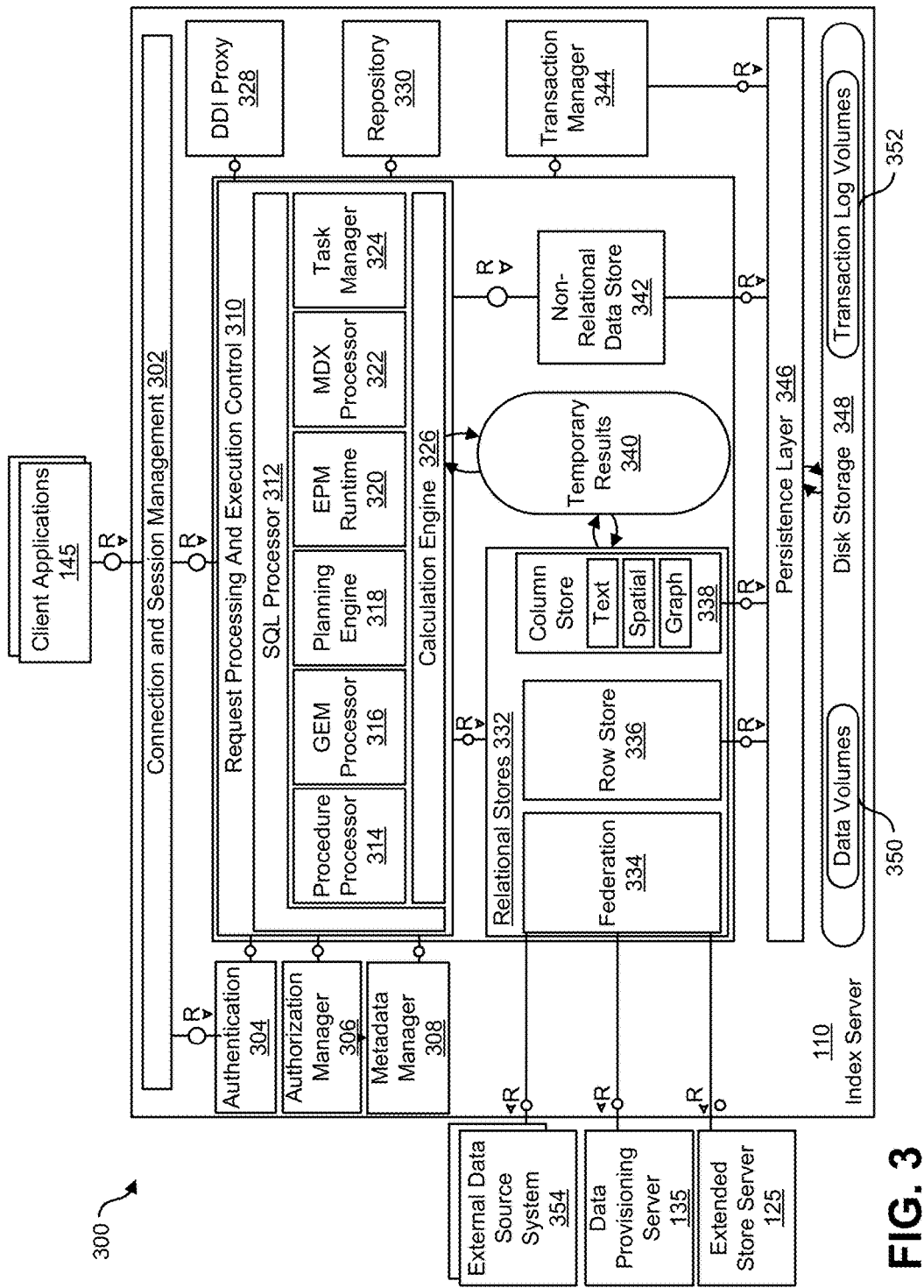
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can be forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which are not kept in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 346 stores data in persistent disk storage 348 which, in turn, can include data volumes 350 and/or recovery log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
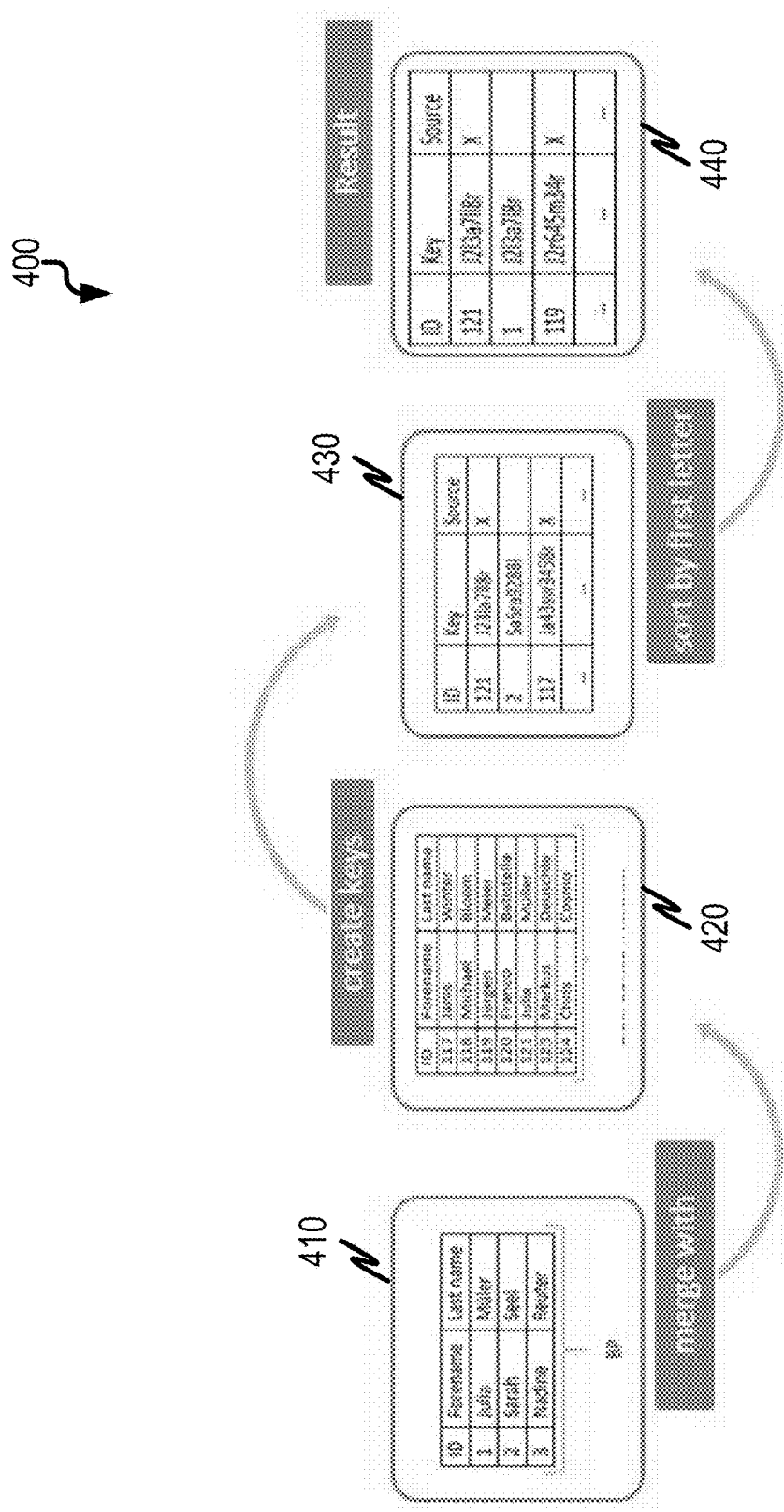
FIG. 4 is flowchart diagram illustrating the generation of neighborhood records.

FIG. 4 is flowchart diagram 400 illustrating the generation of neighborhood records. A data record list 410 can be merged together with a reference list to create a neighborhood 420. Using a phonetic encryption, sorting keys can be created for each record within neighborhood 420 to create a keyed neighborhood 430. For example, a phonetic encryption such as Soundex can be used to encode every letter of each chosen attribute of the neighborhood records, such as a name and/or address, into a sorting key. The use of a phonetic encryption key can prevent spelling errors.

Additionally, a resource identification field can be assigned to each record of data record list 410 to annotate which records originated from the reference list. For example, a resource identification such as "X" can be used as displayed in keyed neighborhood 430. The keyed neighborhood 430 can then be sorted based on the sorting keys to generate a sorted neighborhood 440.

Sorting keys can be split according to several rules in an effort to avoid spelling errors associated with a first letter of a chosen attribute. For example, when encoding first and last names, sorting keys can be split based on a first letter of a first name, a first letter of a last name, a second letter of a first name, and/or a last letter of a last name. For each splitting rule, a new sorted neighborhood can be created. Multiple sorted neighborhoods can be searched for duplicates, using the operations as described herein, in a parallel manner (i.e., multi-pass). Each neighborhood evaluation being a pass.

Duplicate identification using sorted neighborhoods can be used for a variety of different applications in which an input record is screened against a reference list. One example is in connection with business partner screening. Businesses can screen customers and/or business partners against a blocked persons list or against a self-created list.

For example, a business partner "Julia Müller" can be screened against a blocked persons list. "Julia Müller" can be encoded using a Soundex encryption to result in "J213". As previously described, each letter of the name can be encoded to result in a sorting key of "J213m718r". Additionally, if the "Julia Müller" record had an associated address including a street name, city, state, and/or country, this information could also be encoded.

In an effort to reduce the probability of a spelling error associated with the first letter of the attribute, the sorting key can be split several times to ensure a new first letter can be used as an anchor for sorting. For example, after encoding "Julia Müller" to "J213m718r", the letter "J" is used as an anchor for the first pass through of the multi-pass. The sorting key can then be split by the first letter of the first name to create a sorting key of "J213m718r", the first letter of the last name to create a sorting key of "M718rJ213", the second letter of the first name to create a sorting key of "U13jm718r", and the last letter of the last name to create a sorting key of "Rm718J213".

Figures 5A, 5B:
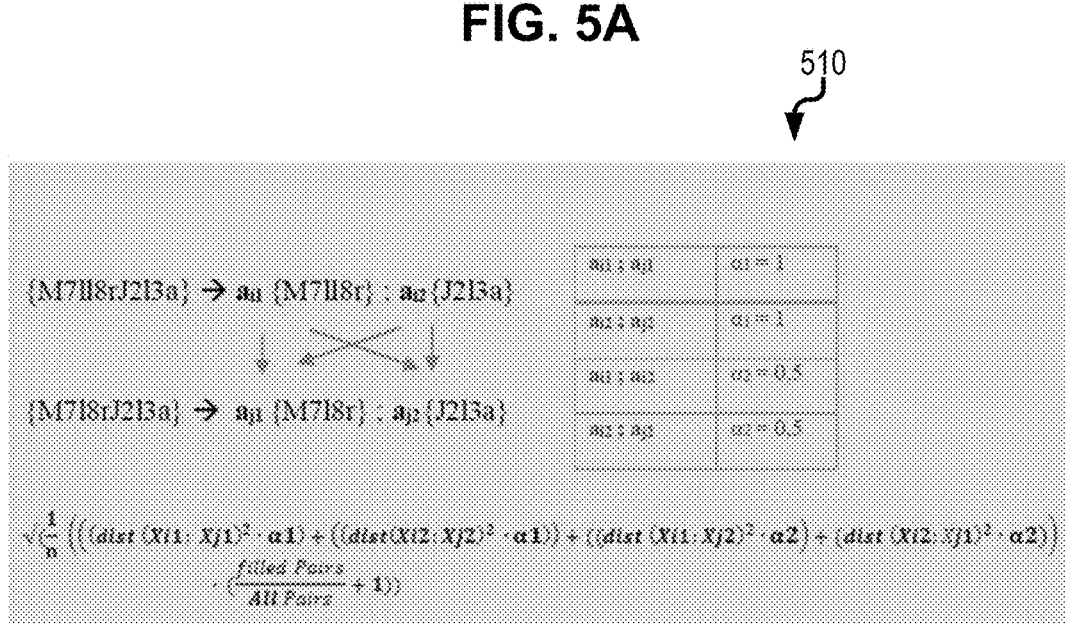
FIG. 5A is an example neighborhood record pair.
FIG. 5B is an example pair distance calculation.

FIG. 5A is an example neighborhood record pair 500. Each neighborhood record of sorted neighborhood 440 can be compared to a closest record having different resource identification fields. For example, record ID 121 of sorted neighborhood 440 can be compared with record ID 1 sorted neighborhood 440 as the resource identification field corresponding to ID 121 is "X" and the resource identification field corresponding to ID 1 is empty. Neighborhood record pair 500 contains, for example, standardized attributes 510, 520, 530 representing a forename, middle name, and last name, respectively, for each neighborhood record 515, 525. Comparisons of each attribute of neighborhood records 515, 525 can be compared to each other for each standardized attribute 510, 520, 530 through a standard deviation distance calculation.

The lack of attributes in standardized attribute 520 can impact a distance calculation. A filled pairs quote value can be calculated to minimize the blank attribute impact. The filled pairs quote value can be calculated using:

$$\text{Filled-pairs-quote} = \frac{\text{filled pairs}}{\text{all pairs}} + 1, \tag{1}$$

where filled pairs is the number of pairs of standardized attributes that are filled and all pairs is the total number of filled attributes.

Weighting factors can also be included in the pair distance calculation to account for inaccurate attribute placement within the neighborhood (i.e., a middle name attribute contained within a forename attribute). FIG. 5B is an example pair distance calculation 510 associated with neighborhood record pair 500. A weight factor, α, can be defined for each attribute based on the pair of attributes being compared. For example, when comparing forename attributes, $\alpha_{i1}$, of pair record 525 and forename attribute, $\alpha_{j2}$, of pair record 515 or last name attribute, $\alpha_{i1}$, of pair record 525 and last name attribute, $\alpha_{j1}$, of pair record 515 a weight, $\alpha_1$, of '1' can be applied. Alternatively, when comparing last name attribute, $\alpha_{i1}$, of data record 525 and forename attribute, $\alpha_{i1}$, of data record 525 or forename attribute, $\alpha_{i2}$, of data record 525 and forename attribute, $\alpha_{j2}$, of data record 515 a weight, $\alpha_2$, of '0.5' can be applied.

Distances between each attribute, as indicated by arrows in pair distance calculation 510, can be computed. For example, the distances between last name attribute, $\alpha_{j1}$, of pair record 515 and last name of attribute, $\alpha_{i1}$, of pair record 525, forename attribute, $\alpha_{i2}$, of pair record 525 and forename attribute, $\alpha_{j2}$, of pair record 515, and middle name attributes of each pair record.

A pair distance can be computed by:

$$\text{Pair distance} = \sqrt{\frac{1}{n}\begin{pmatrix}((dist(X_{i1}:X_{j1})^2\alpha_1)+(dist(X_{i2}:X_{j2})^2\alpha_1))+\\((dist(X_{i1}:X_{j2})^2\alpha_2)+(dist(X_{i2}:X_{j1})^2\alpha_2))\cdot FPQ\end{pmatrix}}, \quad (2)$$

where n is the number of attributes, FPQ is the fair pair quote value calculated using Equation (1), $\alpha_n$ is the applied weight, $X_{in}$ is the attribute position associated with attribute n of the first data record, and $X_{jn}$ is the attribute position associated with attribute n of the second data record.

The computed pair distance of Equation (2) can be compared to a defined threshold value. If the pair distance is less than the threshold value, then the compared pair annotated by the resource identification field as belonging to the input reference list can be removed from consideration as a potential duplicate. The threshold value can be, for example, $$t = \text{fuzzy factor} \cdot \text{max string length}, \quad (3)$$

where t is the threshold, max string length is the string length of the attribute with the greatest string length, and fuzzy factor is a predetermined percentage of the number of letters which do not have to match within the attribute comparison. The fuzzy factor can be predetermined by a user.

For example, the neighborhood record pair 500 has strings "JuliaMüller" and "JuliaMüler". Since "JuliaMüller" has a string length of '11' compared to "JuliaMüler" with a string length of '10', the max string length is 11. Continuing with this example, applying a fuzzy factor of 20% provides a threshold value of 2.2. Should the calculated pair distance be lower than the 2.2 threshold value, there is a potential duplicate between the neighborhood pair records.

From the list of potential duplicates, a final list of duplicates can be determined by comparing each potential with a pool of keys. These keys differ from the sorting keys. Each of the record attributes of the potential duplicates are grouped. The grouped attributes can include a combination of attributes to form groups such as name and/or address for each record. Rules specific to each group can be applied. For example, a definite key can be defined by a user. In one example, a definite key can be a specific name and/or address. A record having grouped attributes matching a defined key can be identified as a final duplicate. If no definite key is defined, a field percentage key can be defined. The field percentage key can be based on a percentage of attributes within the group that matches predetermined attributes. For example, if 50% of attributes within a data record matches a predetermined list of attributes, the record is identified as a final duplicate.

If a comparison between the field percentage key and an attribute does not designate a record as a final duplicate, a predetermined number of additional keys can detect a final duplicate against all keys created related to the original data record.

Figure 6:
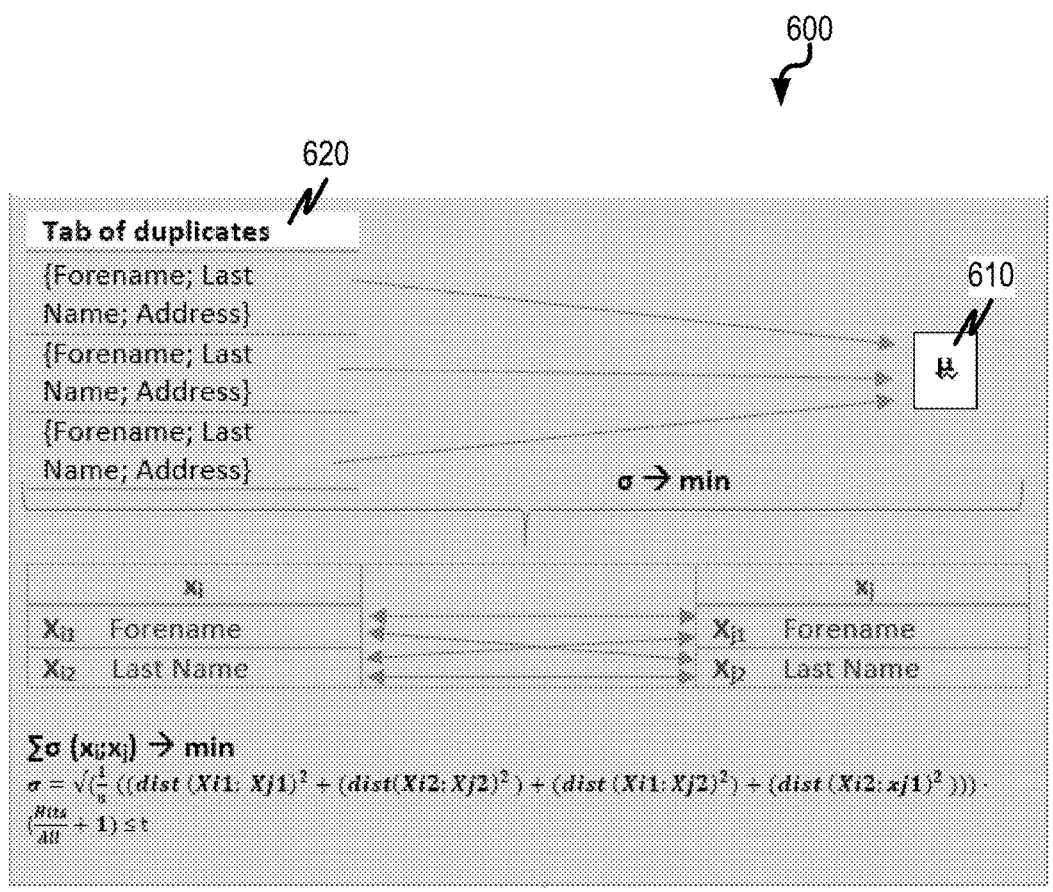
FIG. 6 is an example valid attribute computation.

FIG. 6 is an example valid attribute computation 600. An expectation value 610 can be received from a user selection from a tab of duplicates 620. An attribute with the smallest amount of variability within the summed distances can be used as an anchor of the splitting rules. For example, if a new business partner "Julia Müler" is being evaluated, and a final duplicate list containing "Julia Müller", "Julie Müler", "Jules Miller", and "Jodie Mueler" has been generated by using the subject matter described herein, a user can select "Julia Müller" as the accurate duplicate. The user selection can be used to create a refined listing of final duplicates by matching the expectation value with the final duplicate records.

Figure 7:
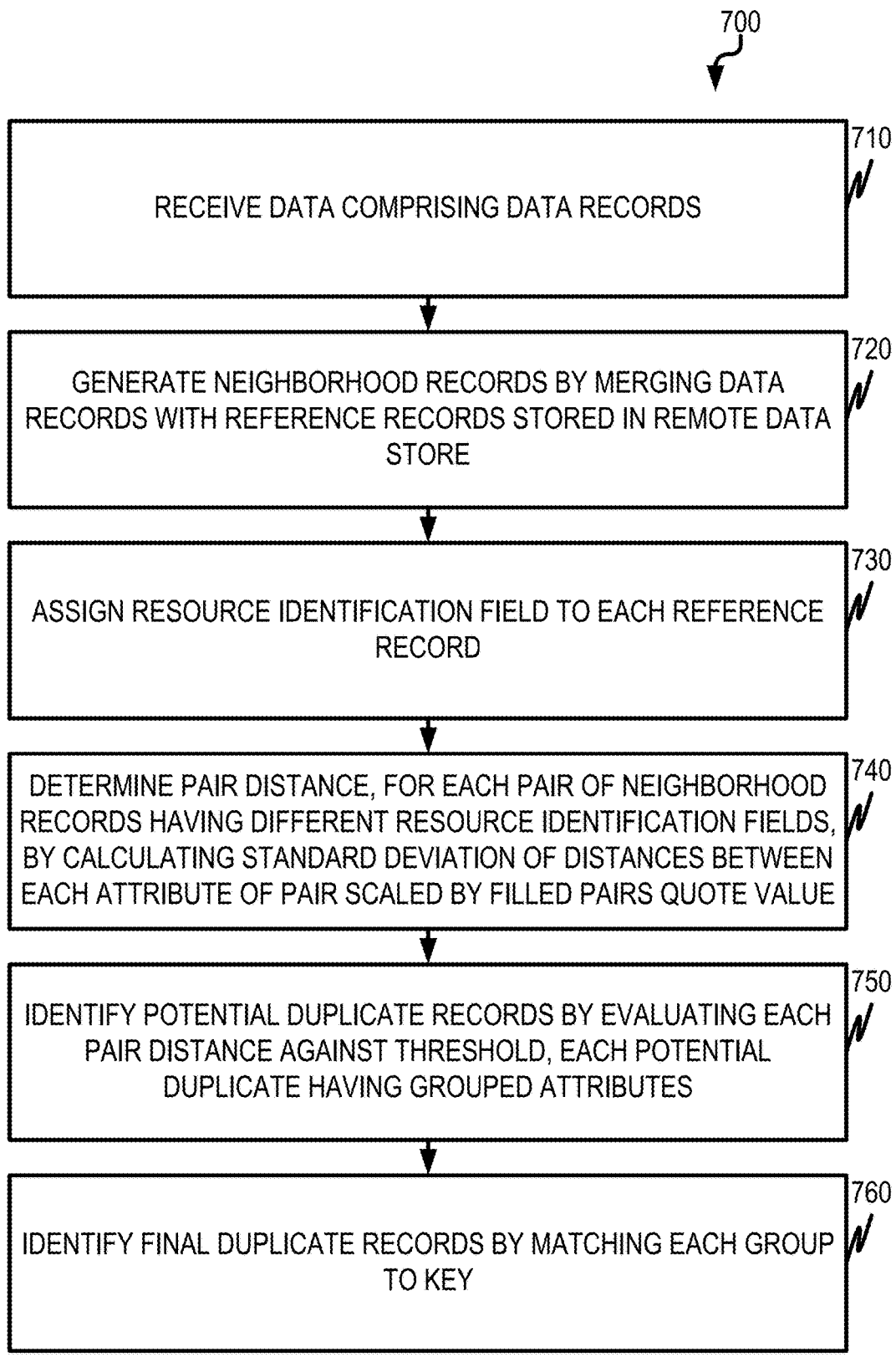
FIG. 7 is an example process flow diagram for multi-pass duplicate identification using sorted neighborhoods.

FIG. 7 is an example process flow diagram 700 for multi-pass duplicate identification using sorted neighborhoods. Data comprising a plurality of data records are received, at 710. A plurality of neighborhood records are generated, at 720, by merging a plurality of data records with a plurality of reference records stored in a remote data store. A resource identification field is assigned, at 730, to each reference record. A pair distance, for each pair of neighborhood records having different resource identification fields, are determined, at 740, by calculating the standard deviation of distances between each attribute of the pair scaled by the filled pairs quote value. A plurality of potential duplicate records are identified, at 750, by evaluating each pair distance against a threshold, each possible duplicate having grouped attributes. A plurality of final duplicate records can be identified, at 760, by matching each group to a key.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 8:
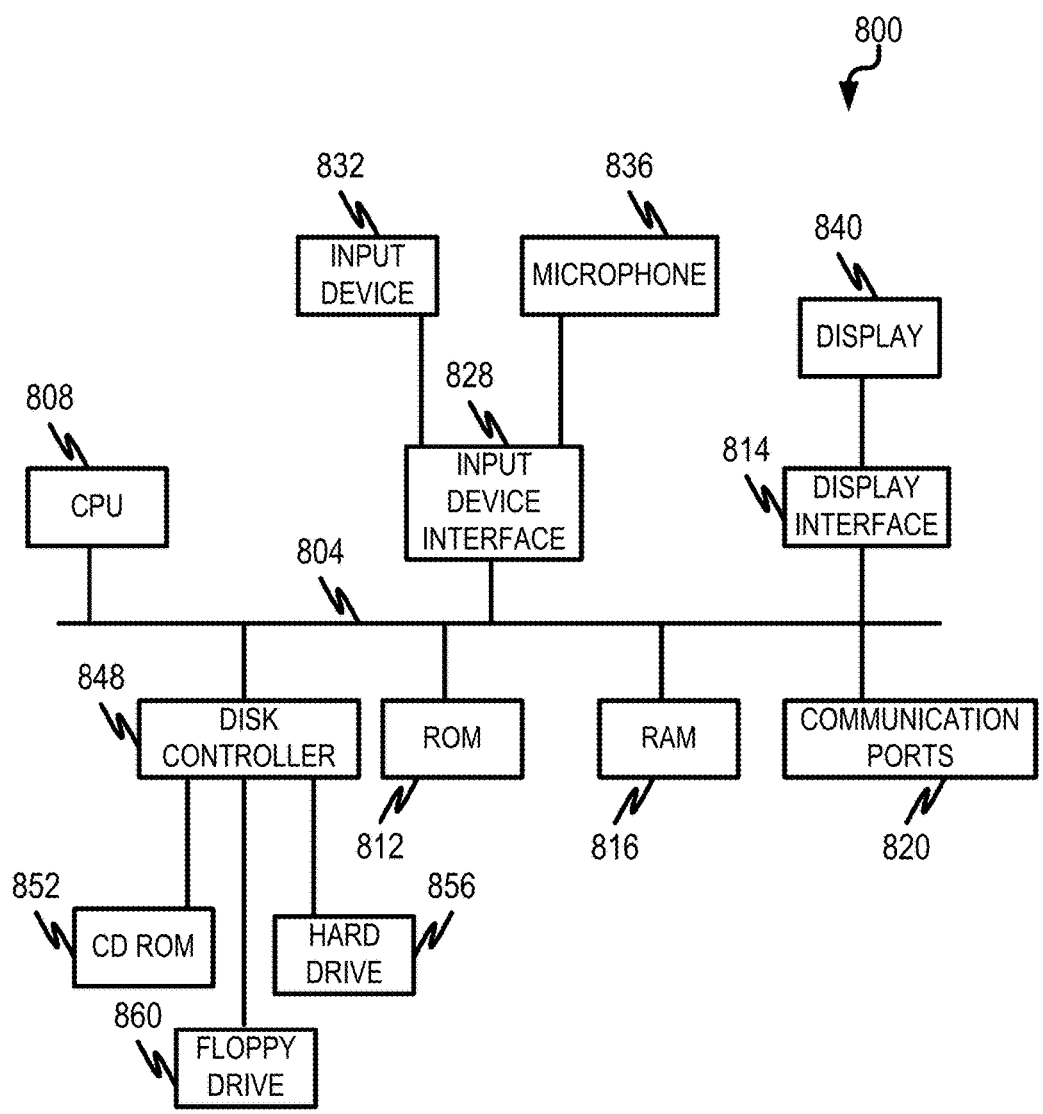
FIG. 8 is a diagram illustrating a sample computing device architecture for implementing various aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. Input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by a database management system, the method comprising:
   receiving data comprising a plurality of data records;
   generating a plurality of neighborhood records by merging the plurality of data records with a plurality of reference records stored in a remote data store;
   assigning a resource identification field to each reference record;
   determining a pair distance, for each pair of neighborhood records having different resource identification fields, by calculating a standard deviation of distances between each attribute of the pair scaled by a filled pairs quote value;
   identifying a plurality of potential duplicate records by evaluating each pair distance against a threshold, each potential duplicate having grouped attributes, the threshold being a product of a fuzzy factor and a maximum string length of an attribute; and
   identifying a plurality of final duplicate records by matching each group to a key.

2. The method according to claim 1, wherein the method further comprises:
    receiving an expectation value from a user selection of the plurality of final duplicate records; and
    identifying a refined plurality of final duplicate records by matching the expectation value to the plurality of final duplicate records.

3. The method according to claim 1, wherein each neighborhood record comprises a plurality of attributes categorized based on a plurality of standardized attributes and are sorted based on a sorting key associated with each attribute.

4. The method according to claim 1, wherein the resource identification field identifies a source location of each reference record.

5. The method according to claim 1, wherein the filled pairs quote value is one more than the ratio of a number of unfilled attributes of the pair of neighboring records to a number of filled for each pair.

6. The method according to claim 1, wherein the key is either a definite key or a field percentage key.

7. The method according to claim 6, wherein the definite key is defined by a user.

8. The method according to claim 6, wherein the field percentage key is based on a percentage of attributes within the group matches predetermined attributes.

9. The method according to claim 1, wherein the fuzzy factor is pre-determined by a user.

10. The method according to claim 1, wherein the plurality of data records and the plurality of neighborhood records are related to business partner screening.

11. The method according to claim 1, wherein the receiving, generating, assigning, determining, and identifying occur in an in-memory database.

12. A non-transitory computer-programmable product including storing instructions which, when executed by at least one data processor forming part of at least one computing system, result in operations comprising:
    receiving data comprising a plurality of data records;
    generating a plurality of neighborhood records by merging the plurality of data records with a plurality of reference records stored in a remote data store;
    assigning a resource identification field to each reference record;
    determining a pair distance, for each pair of neighborhood records having different resource identification fields, by calculating a standard deviation of distances between each attribute of the pair scaled by a filled pairs quote value;
    identifying a plurality of potential duplicate records by evaluating each pair distance against a threshold, each potential duplicate having grouped attributes, the threshold being a product of a fuzzy factor and a maximum string length of an attribute; and
    identifying a plurality of final duplicate records by matching each group to a key.

13. The non-transitory computer-programmable product according to claim 12, wherein the operations further comprise:
    receiving an expectation value from a user selection of the displayed plurality of final duplicate records; and
    identifying a refined plurality of final duplicate records by matching the expectation value to the plurality of final duplicate records.

14. The non-transitory computer-programmable product according to claim 12, wherein each neighborhood record comprises a plurality of attributes categorized based on a plurality of standardized attributes and are sorted based on a sorting key associated with each attribute.

15. The non-transitory computer-programmable product according to claim 12, wherein the resource identification field identifies a source location of each reference record.

16. The non-transitory computer-programmable product according to claim 12, wherein the filled pairs quote value is one more than the ratio of a number of unfilled attributes of the pair of neighboring records to a number of filled for each pair.

17. The non-transitory computer-programmable product according to claim 12, wherein the key is either a definite key or a field percentage key, the definite key is defined by a user, and the field percentage key is based on a percentage of attributes within the group matches predetermined attributes.

18. The non-transitory computer-programmable product according to claim 12, wherein the fuzzy factor is pre-determined by a user.

19. A system comprising:
    at least one data processor;
    memory storing instructions which, when executed by the at least one data processor, result in operations comprising:
        receiving data comprising a plurality of data records;
        generating a plurality of neighborhood records by merging the plurality of data records with a plurality of reference records stored in a remote data store;
        assigning a resource identification field to each reference record;
        determining a pair distance, for each pair of neighborhood records having different resource identification fields, by calculating a standard deviation of distances between each attribute of the pair scaled by a filled pairs quote value;
        identifying a plurality of potential duplicate records by evaluating each pair distance against a threshold, each potential duplicate having grouped attributes, the threshold being a product of a fuzzy factor and a maximum string length of an attribute; and
        identifying a plurality of final duplicate records by matching each group to a key.

20. The system of claim 19, wherein the filled pairs quote value is calculated to minimize a blank attribute impact, wherein the filled pairs quote value can be calculated using:

$$\text{Filled-pairs-quote} = (\text{filled pairs})/(\text{all pairs}) + 1,$$

where filled pairs is a number of pairs of standardized attributes that are filled and all pairs is a total number of filled attributes.

* * * * *